United States Patent [19]

Oishi

[11] Patent Number: 4,704,649
[45] Date of Patent: Nov. 3, 1987

[54] MAGNETIC DISK CARTRIDGE
[75] Inventor: Kengo Oishi, Kanagawa, Japan
[73] Assignee: Fuji Photo Film Co., Ltd., Japan
[21] Appl. No.: 810,163
[22] Filed: Dec. 18, 1985
[30] Foreign Application Priority Data Dec. 20, 1984 [JP] Japan ............................ 59-193403[U]

[51] Int. Cl.[4] ...................... G11B 23/02; G11B 23/033
[52] U.S. Cl. ...................................... 360/133; 360/97; 360/99
[58] Field of Search .................... 360/133, 135, 97–99

[56] References Cited

FOREIGN PATENT DOCUMENTS

| 0137311 | 4/1985 | European Pat. Off. | 360/97 |
| 58-35772 | 3/1983 | Japan | 360/133 |
| 60-20373 | 2/1985 | Japan | 360/133 |
| 2108309 | 5/1983 | United Kingdom | 360/133 |

Primary Examiner—John H. Wolff
Attorney, Agent, or Firm—Gerald J. Ferguson, Jr.; Michael P. Hoffman; Michael J. Foycik, Jr.

[57] ABSTRACT

A magnetic disk cartridge comprises a case, a magnetic disk sheet rotatably housed in the case, and an approximately columnar center core positioned inside of the case and having a bottom surface formed as a magnetic chuck surface exposed from an aperture at the center of the case. The center core is provided with a disk sheet securing surface which faces the side opposite to the magnetic chuck surface and which is formed to a size not larger than the outer diameter of the magnetic chuck surface and further the marginal portion of which is stepped down as so not to contact the disk sheet. The magnetic disk sheet is secured to the disk sheet securing surface.

3 Claims, 5 Drawing Figures

PRIOR ART FIG. 4
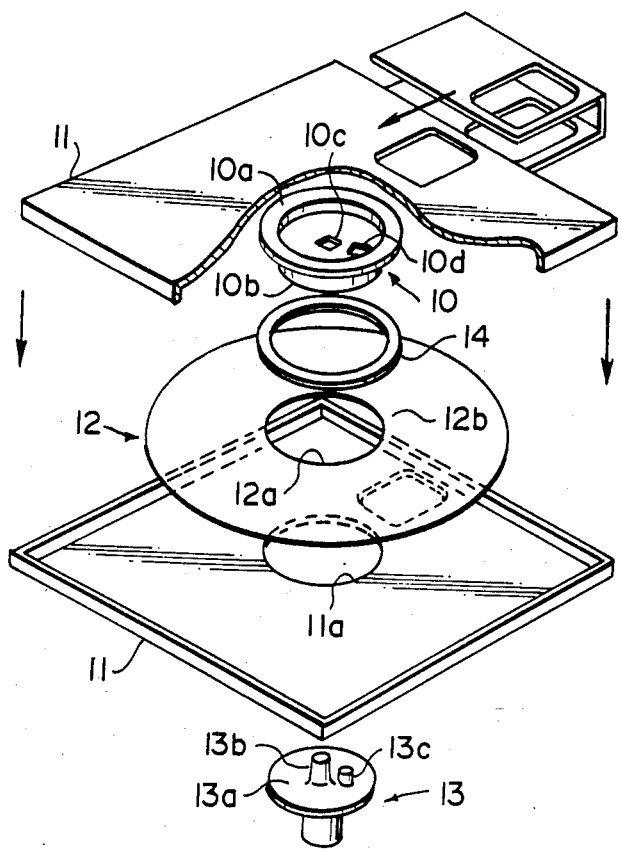
PRIOR ART FIG. 5
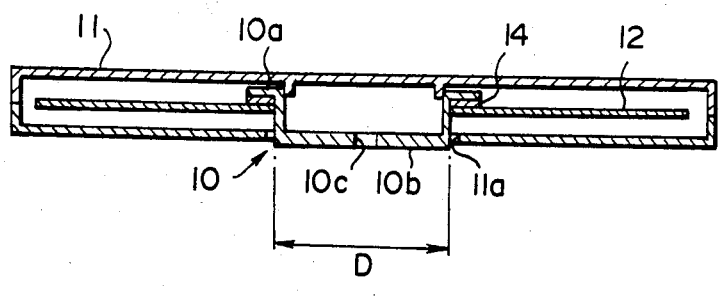

MAGNETIC DISK CARTRIDGE

BACKGROUND OF THE INVENTION

1. Field of the Invention

This invention relates to a magnetic disk cartridge comprising a small-diameter, very thin flexible magnetic disk sheet housed in a case and rotated at a high speed for magnetic recording and reproduction. This invention particularly relates to a magnetic disk cartridge which prevents distortion arising at a magnetic disk sheet portion secured to a center core from adversely affecting the recording and reproduction.

2. Description of the Prior Art

Floppy disks are widely used as recording media for computers because they are easy to handle and low in cost. The floppy disk comprises a disk-like base made of a flexible polyester sheet or the like, and magnetic material layers overlaid on opposite surfaces of the disk-like base. The floppy disk is rotated at a high speed for magnetically recording information on the magnetic material layers by use of a magnetic head. On the other hand, by utilizing the aforesaid advantages of the floppy disk and the advantage that a magnetic recording medium has over silver halide photographic films in that the magnetic recording medium can be reused, it has been proposed to use a magnetic disk having a size smaller than the size of the floppy disk as an image recording medium in still cameras. The magnetic disk used for still cameras comprises a small-diameter, very thin magnetic disk sheet rotatably housed in a small case. The combination of the magnetic disk sheet with the case is called a magnetic disk cartridge.

FIGS. 4 and 5 are an exploded perspective view and a sectional side view showing the conventional magnetic disk cartridge. In the conventional magnetic disk cartridge, a hat-like center core 10 is rotatably supported in a case 11, and an inner circumferential edge portion 12b of a magnetic disk sheet 12 having a circular hole 12a at its center is secured to a flange portion 10a of the center core 10. An end face 10b of the center core 10 is exposed as a magnetic chuck surface from an aperture 11a at the center of the case 11, and magnetically chucked to a magnetic chuck portion 13a of a rotation drive shaft 13 of the floppy disk driver. Also, engagement pins 13b and 13c of the drive shaft 13 are engaged with engagement holes 10c and 10d of the end face 10b to rotate the magnetic disk sheet 12 inside of the case 11. Normally, the inner circumferential edge portion 12b of the magnetic disk sheet 12 is secured by a ring-like double-faced adhesive member 14 to the flange portion 10a.

When the magnetic disk sheet 12 is secured to the flange portion 10a of the center core 10, wrinkle-like distortion readily arises at the portion of the magnetic disk sheet 12 secured to the center core 10, particularly in the case where a material based on a nonwoven fabric is used as the double-faced adhesive member 14. The distortion obstructs increase in the recording capacity of the magnetic disk cartridge. Specifically, in order to increase the recording capacity of the magnetic disk sheet having a defined outer diameter, the recording area of the magnetic disk sheet is expanded as close to the sheet center as possible. However, when distortion extends up to the recording area, the magnetic head of the recording and/or reproducing apparatus does not correctly contact the magnetic disk sheet. Further, since the flatness of the recording surface is low, information is not correctly recorded and reproduced.

One approach to elimination of the aforesaid problems is to make the diameter of the hat-like center core 10 small and to make small the diameter of the circular hole 12a at the center of the magnetic disk sheet 12. However, this method is not practicable since the diameter of the magnetic chuck portion 13a of the floppy disk driver and the positions of the engagement pins 13b and 13c are defined by standards.

SUMMARY OF THE INVENTION

The primary object of the present invention is to provide a magnetic disk cartridge which eliminates the problems caused by distortion of the magnetic disk sheet portion secured to the center core in the manner conforming to the present standards.

Another object of the present invention is to provide a magnetic disk cartridge exhibiting a recording capacity higher than in the conventional magnetic disk cartridge.

The present invention provides a magnetic disk cartridge having a case and a magnetic disk sheet rotatably housed in the case, the magnetic disk cartridge comprising: an approximately columnar center core positioned inside of said case and having a bottom surface formed as a magnetic chuck surface exposed from an aperture at the center of said case, said center core being provided with a disk sheet securing surface which faces the side opposite to said magnetic chuck surface and which is formed to a size not larger than the outer diameter of said magnetic chuck surface and further the marginal portion of which is stepped down so as not to contact the disk sheet, said magnetic disk sheet being secured to said disk sheet securing surface.

In the magnetic disk cartridge of the present invention, it is possible to increase the recording area of the magnetic disk sheet without adverse effect of distortion arising at the magnetic disk sheet portion secured to the center core on recording and reproducing. Therefore, it becomes possible to increase the recording capacity as compared with the conventional magnetic disk cartridge.

BRIEF DESCRIPTION OF THE DRAWINGS

FIGS. 4 and 5 are an exploded perspective view and a sectional side view showing the conventional magnetic disk cartridge.

DESCRIPTION OF THE PREFERRED EMBODIMENTS

The present invention will hereinbelow be described in further detail with reference to the accompanying drawings.

Figure 1:
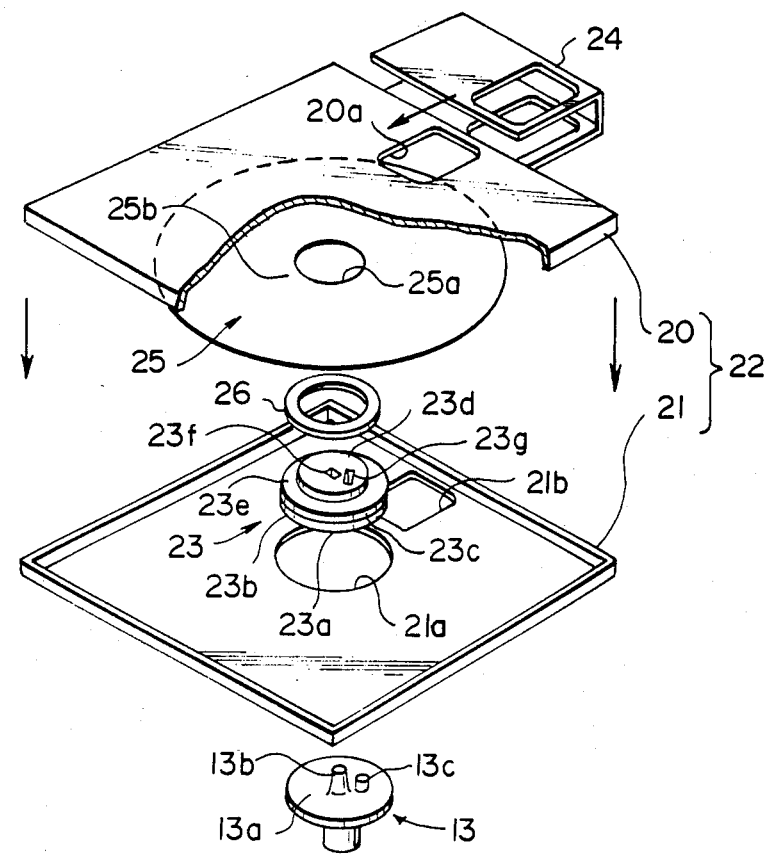
FIGS. 1 and 2 are an exploded perspective view and a sectional side view showing an embodiment of the magnetic disk cartridge of the present invention.
Figure 2:
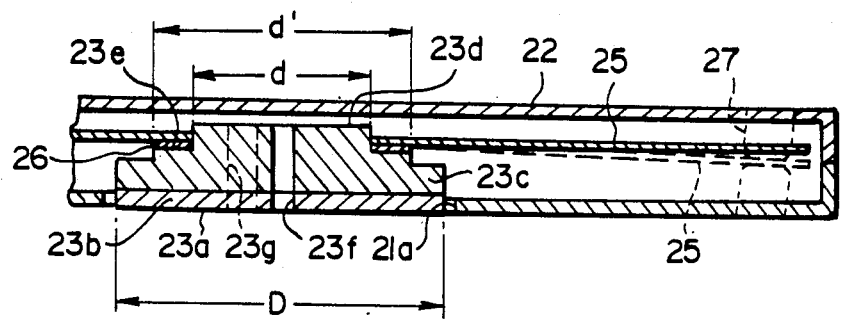

Referring to FIGS. 1 and 2, an approximately columnar center core 23 is rotatably housed in a case 22 comprising an upper half 20 and a lower half 21. The center core 23 is positioned so that its bottom surface 23a is exposed from an aperture 21a at the center of the lower half 21. The case 22 is provided with head insertion apertures 20a and 21b, a slidable shutter 24, a liner (not shown) contacting a magnetic disk sheet 25, or the like, and is constituted in the same manner as the conventional magnetic disk cartridge.

The center core 23 is constituted by a circular metal plate 23b including the bottom surface 23a, and a thin, columnar member 23c formed integrally with the metal plate 23b. The metal plate 23b is fabricated, for example, of a magnetic metal such as iron, and the columnar member 23c is fabricated of a non-magnetic material such as a plastic material. The outer diameter D of the metal plate 23b is adjusted to the same value as the outer diameter of the magnetic chuck surface defined by the relevant standards (i.e. the outer diameter of the end face 10b of the center core 10 in the magnetic disk cartridge of FIGS. 4 and 5. The portion of the columnar member 23c secured to the metal plate 23b formed to the same diameter as the diameter of the metal plate 23b, and the end portion of the columnar member 23c opposite to the portion secured to the metal plate 23b is provided with a columnar protrusion (guide portion) 23d having an outer diameter D smaller than the outer diameter of the metal plate 23b. Therefore, a ring-like surface 23e having the outer diameter D and the inner diameter d which is parallel to the metal plate 23b and faces the side opposite to the bottom surface 23a is formed outside of the protrusion 23d. The ring-like surface 23e acts as a disk sheet securing surface. Further, the marginal portion of the disk securing surface 23e is stepped down and the disk sheet securing surface 23e has the diameter d' which is smaller than the outer diameter D of said metal plate 23b.

The flexible magnetic disk sheet 25 has at its center a circular hole 25a having a diameter slightly larger than the outer diameter of the columnar protrusion 23d. When the magnetic disk sheet 25 is secured to the center core 23, a ring-like double-faced adhesive member 26 having an outer diameter equal to or slightly smaller than the outer diameter of the disk sheet securing surface 23e is first secured to the disk sheet securing surface 23e. Then, the circular hole 25a at the center of the magnetic disk sheet 25 is fitted to the protrusion 23d, and the magnetic disk sheet 25 is pushed towards the center core 23. In this manner, a circumferential edge portion 25b around the circular hole 25a at the center of the magnetic disk sheet 25 is secured to the double-faced adhesive member 26 and the center core 23.

When the magnetic disk cartridge having the aforesaid configuration is loaded to the recording and/or reproducing apparatus, the metal plate 23b is secured by magnetic attraction to a magnetic chuck portion 13a of a rotation drive shaft 13 of the floppy disk driver, and engagement pins 13b and 13c engage with engagement holes 23f and 23g of the center core 23. Accordingly, when the drive shaft 13 is rotated, the center core 23 rotates, and the magnetic disk sheet 25 secured to the center core 23 also rotates inside of the case 22. Also, as is known, a magnetic head 27 (FIG. 2) of the recording and/or reproducing apparatus contacts the magnetic disk sheet 25 via the head insertion aperture 20a or 21b while the magnetic disk sheet 25 rotates. In this manner, information is recorded on the magnetic disk sheet 25 or reproduced therefrom by use of the magnetic head.

As described above, wrinkle-like distortion readily arises at the portion of the magnetic disk sheet 25 secured to the center core 23, and the distortion normally extends up to a point slightly outside of the secured portion of the magnetic disk sheet 25. Therefore, the recording area of the magnetic disk sheet 25 must be adjusted so that the innermost circumferential portion of the recording area is at least slightly outside of the portion of the magnetic disk sheet 25 secured to the center core 23.

In the embodiment of FIG. 1, the magnetic disk sheet 25 is secured via the double-faced adhesive member 26 to the disk sheet securing surface 23e having the outer diameter equal to the outer diameter D of the metal plate 23b including the magnetic chuck surface. Therefore, when the size of the recording area of the magnetic disk sheet is the same, the distance between the innermost circumferential portion of the recording area and the portion of the magnetic disk sheet secured to the center core in the present invention becomes larger than in the conventional magnetic disk cartridge wherein, as shown in FIGS. 4 and 5, the magnetic disk sheet 12 is secured to the flange portion 10a larger than the magnetic chuck surface (end face) 10b. Stated differently, in the embodiment of FIG. 1, adverse effects of distortion of the magnetic disk sheet portion secured to the center core on the recording area of the magnetic disk sheet become smaller than in the conventional magnetic disk cartridge, and incorrect recording and reproduction are prevented.

Further, in the magnetic disk cartridge, since the marginal portion of the disk sheet securing surface 23e is stepped down, the magnetic disk sheet 25 is prevented from contacting the edge of the center core 23 and from being distorted thereby even when the magnetic disk sheet 25 is displaced to the bottom side being pushed by the magnetic head 27 as shown by the broken line in FIG. 2. Therefore, said effect or advantage owing to the shape of the center core 23 that the disk sheet securing surface 23e is smaller than the bottom surface 23a is not ruined.

Figure 3:
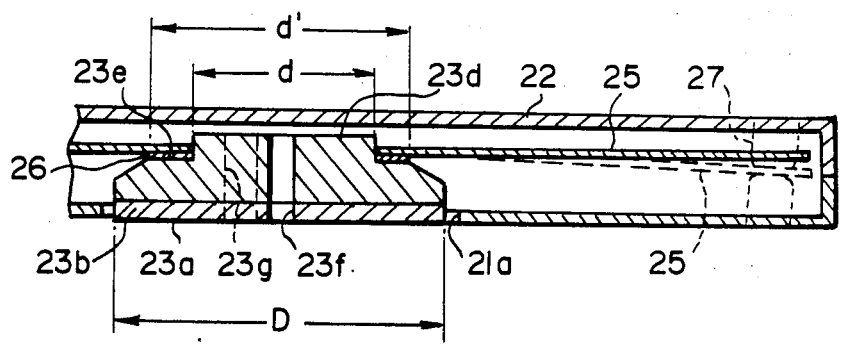
FIG. 3 is a sectional side view showing another embodiment of the magnetic disk cartridge of the present invention.

FIG. 3 shows another embodiment of the magnetic disk cartridge in accordance with the present invention. In FIG. 3, similar elements are numbered with the same reference numerals with respect to FIGS. 1 and 2. In this embodiment, the marginal portion of the disk sheet securing surface 23e of the center core 23 is tapered to make it lower than the disk sheet securing surface 23e. With such a structure, similarly to the aforesaid embodiment, the magnetic disk sheet 25 is prevented from contacting the center core 23 when the disk sheet 25 is displaced by the magnetic head 27.

Covering the above two embodiments as shown in FIGS. 1 to 3, the shape of the marginal portion of the magnetic disk sheet securing surface 23e is referred to as "stepped down" as defined in claim 1. That is, the "stepped down" referred to herein should be interpreted to read on not only the embodiment as shown in FIGS. 1 and 2, but also the embodiment as shown in FIG. 3.

Though the center core is constituted by the magnetic metal and the non-magnetic material in the aforesaid embodiments, it may also be fabricated only of the magnetic metal by press forming, die casting, or the like. In this case, the center core may be formed as a hollow body to reduce its weight, or the like.

I claim:
1. A magnetic disk cartridge having a case and a magnetic disk sheet rotatably mounted in the case, the magnetic disk cartridge comprising: an approximately columnar center core positioned inside of said case and having a bottom surface formed as a magnetic chuck receptive surface exposed from an aperture at the center of said case, said center core being provided with a disk sheet securing surface having securing means which faces the side opposite to said magnetic chuck receptive surface and which is formed to a size not larger than the outer diameter of said magnetic chuck receptive surface, with the marginal portion of said surface being stepped down so as not to contact the magnetic disk sheet in said marginal portion, said magnetic disk sheet being secured to said disk sheet securing surface, whereby contact distortion as well as edge distortion between the columnar center core disc securing surface and disc sheet is minimized.

2. A magnetic disk cartridge as defined in claim 1 wherein said center core comprises a magnetic metal plate constituting said magnetic chuck receptive surface, and an approximately columnar member fabricated of a non-magnetic material and including said disk sheet securing surface, said approximately columnar member being secured to said magnetic metal plate.

3. A magnetic disk cartridge as defined in claim 1 or 2 wherein said magnetic disk sheet is provided with a circular hole at its center, and a columnar guide portion for engagement with said circular hole at the center of said magnetic disk sheet is protruded inside of said disk sheet securing surface of said center core.

* * * * *